(12) United States Patent
Gorog

(10) Patent No.: US 11,947,681 B2
(45) Date of Patent: Apr. 2, 2024

(54) CRYPTOGRAPHIC SECRET GENERATION AND PROVISIONING

(71) Applicant: BlockFrame, Inc., Colorado Springs, CO (US)

(72) Inventor: Christopher Paul Gorog, Pueblo, CO (US)

(73) Assignee: BLOCKFRAME, INC., Colorado Springs, CO (US)

(*) Notice: Subject to any disclaimer, the term of this patent is extended or adjusted under 35 U.S.C. 154(b) by 288 days.

(21) Appl. No.: 17/488,589

(22) Filed: Sep. 29, 2021

(65) Prior Publication Data

US 2022/0108027 A1 Apr. 7, 2022

Related U.S. Application Data

(60) Provisional application No. 63/086,904, filed on Oct. 2, 2020, provisional application No. 63/086,925, filed
(Continued)

(51) Int. Cl.
*G06F 21/00* (2013.01)
*G06F 16/23* (2019.01)
(Continued)

(52) U.S. Cl.
CPC ........ *G06F 21/602* (2013.01); *G06F 16/2379* (2019.01); *G06F 21/604* (2013.01); *G06F 21/6209* (2013.01); *G06Q 10/0835* (2013.01); *G06Q 10/087* (2013.01); *G06Q 20/389* (2013.01); *G06Q 20/401* (2013.01);
(Continued)

(58) Field of Classification Search
None
See application file for complete search history.

(56) References Cited

U.S. PATENT DOCUMENTS 10,783,590 B1  9/2020  Zhou
11,138,602 B2  10/2021 Lu
(Continued)

FOREIGN PATENT DOCUMENTS

CA    3061603 A1    5/2020
CN    110245956 A   9/2019
(Continued)

OTHER PUBLICATIONS

PCT Notification of Transmittal of the International Search Report and the Written Opinion of the International Searching Authority for PCT Application No. PCT/US21/52839, dated Jan. 11, 2022.
(Continued)

*Primary Examiner* — Andrew J Steinle
(74) *Attorney, Agent, or Firm* — Lowenstein Sandler LLP

(57) ABSTRACT

A system includes a memory device and a processor, operatively coupled with the memory device, to perform operations including receiving, from a device via a brokering agent, a request to provide an encrypted version of a set of secrets data corresponding to a target state of the device, determining whether to authorize the request in view of the brokering agent, and in response to authorizing the request, providing the encrypted version of the set of secrets data and permission to transition to the target state.

20 Claims, 5 Drawing Sheets

Related U.S. Application Data on Oct. 2, 2020, provisional application No. 63/086,926, filed on Oct. 2, 2020, provisional application No. 63/086,928, filed on Oct. 2, 2020, provisional application No. 63/123,067, filed on Dec. 9, 2020.

(51) Int. Cl.

| | | |
|---|---|---|
| *G06F 21/60* | (2013.01) | |
| *G06F 21/62* | (2013.01) | |
| *G06Q 10/0835* | (2023.01) | |
| *G06Q 10/087* | (2023.01) | |
| *G06Q 20/38* | (2012.01) | |
| *G06Q 20/40* | (2012.01) | |
| *H04L 9/08* | (2006.01) | |
| *H04L 9/40* | (2022.01) | |

(52) U.S. Cl.
CPC ............ *H04L 9/0827* (2013.01); *H04L 9/085* (2013.01); *H04L 9/0861* (2013.01); *H04L 9/0877* (2013.01); *H04L 63/0442* (2013.01); *H04L 63/0823* (2013.01); *H04L 63/0838* (2013.01)

(56) References Cited

U.S. PATENT DOCUMENTS

| | | | |
|---|---|---|---|
| 11,232,221 B2 | 1/2022 | Novotny | |
| 11,310,311 B2 | 4/2022 | Shrinivasan | |
| 2010/0125670 A1 | 5/2010 | Dondeti | |
| 2013/0151317 A1* | 6/2013 | Charfi | G06Q 30/0201 705/7.36 |
| 2014/0093074 A1 | 4/2014 | Gotze | |
| 2016/0078208 A1 | 3/2016 | Namiki | |
| 2016/0366111 A1 | 12/2016 | Smith et al. | |
| 2017/0083724 A1 | 3/2017 | Chhabra | |
| 2018/0041484 A1 | 2/2018 | Gifford et al. | |
| 2018/0130158 A1 | 5/2018 | Atkinson | |
| 2018/0198604 A1 | 7/2018 | Hayton | |
| 2018/0254898 A1 | 9/2018 | Sprague | |
| 2018/0316492 A1 | 11/2018 | Ramachandran | |
| 2019/0132410 A1* | 5/2019 | Kuzkin | G06F 21/57 |
| 2019/0164137 A1 | 5/2019 | Vincent | |
| 2019/0349426 A1 | 11/2019 | Smith et al. | |
| 2019/0354968 A1 | 11/2019 | Sato | |
| 2019/0370250 A1 | 12/2019 | Tipton et al. | |
| 2020/0067907 A1 | 2/2020 | Avetisov | |
| 2020/0074415 A1 | 3/2020 | Jayaram | |
| 2020/0097927 A1 | 3/2020 | Groarke | |
| 2020/0099532 A1 | 3/2020 | Goldman | |
| 2020/0119904 A1 | 4/2020 | Philyaw | |
| 2020/0120079 A1* | 4/2020 | Callaghan | H04L 9/3226 |
| 2020/0142979 A1* | 5/2020 | Nakamura | G06F 16/27 |
| 2020/0242249 A1 | 7/2020 | Kumar | |
| 2020/0320207 A1 | 10/2020 | Beno | |
| 2020/0403805 A1 | 12/2020 | Steele | |
| 2021/0081557 A1 | 3/2021 | Thomson-Wood | |
| 2021/0382831 A1 | 12/2021 | Sun | |

FOREIGN PATENT DOCUMENTS

| | | |
|---|---|---|
| WO | 2019081919 A1 | 5/2019 |
| WO | 2019175878 A1 | 9/2019 |
| WO | 2020001996 A1 | 1/2020 |
| WO | 2022016280 A1 | 1/2022 |

OTHER PUBLICATIONS

PCT Notification of Transmittal of the International Search Report and the Written Opinion of the International Searching Authority for PCT Application No. PCT/US21/52872, dated Jan. 12, 2022.

USPTO, Office Action for U.S. Appl. No. 17/488,655, dated Jun. 22, 2023.

USPTO, Final Office Action for U.S. Appl. No. 17/488,562, dated Oct. 20, 2023.

USPTO, Office Action for U.S. Appl. No. 17/488,562, dated Apr. 26, 2023.

PCT Notification of Transmittal of the International Search Report and the Written Opinion of the International Searching Authority for PCT Application No. PCT/US21/52865, dated Dec. 28, 2021.

PCT Notification of Transmittal of the International Search Report and the Written Opinion of the International Searching Authority for PCT Application No. PCT/US21/52854, dated Dec. 29, 2021.

PCT Notification Concerning Transmittal of International Preliminary Report on Patentability for PCT Application No. PCT/US2021/052854, dated Apr. 13, 2023, 6 pages.

PCT Notification Concerning Transmittal of International Preliminary Report on Patentability for PCT Application No. PCT/US2021/052865, dated Apr. 13, 2023, 11 pages.

PCT Notification Concerning Transmittal of International Preliminary Report on Patentability for PCT Application No. PCT/US2021/052839, dated Apr. 13, 2023, 10 pages.

PCT Notification Concerning Transmittal of International Preliminary Report on Patentability for PCT Application No. PCT/US2021/052872, dated Apr. 13, 2023, 9 pages.

Skudlarek et al. "A Platform Solution for Secure Supply-Chain and Chip Life-Cycle", Computer, vol. 49, No. 8, pp. 28-34, Aug. 2016 (Year: 2016).

\* cited by examiner

CRYPTOGRAPHIC SECRET GENERATION AND PROVISIONING

RELATED APPLICATIONS

The present Application claims priority to Provisional U.S. Patent Application No. 63/086,904, filed on Oct. 2, 2020 and entitled "BLOCKCHAIN SYNCHRONOUS TRUST CONSENSUS MODEL," Provisional U.S. Patent Application No. 63/086,925, filed on Oct. 2, 2020 and entitled "SECURITY MANAGEMENT FRAMEWORK FOR SUPPLY CHAIN FOR ENERGY DELIVERY SYSTEMS," Provisional U.S. Patent Application No. 63/086,926, filed on Oct. 2, 2020 and entitled "ADVANCED SECURITY MODEL BASED ON HYBRID BLOCKCHAIN AND CRYPTOGRAPHIC TRUST CHAIN ARCHITECTURE," Provisional U.S. Patent Application No. 63/086,928, filed on Oct. 2, 2020 and entitled "OPERATIONS AND USAGE OF CTC AND EMBEDDED LIBRARIES FOR ENABLING ADVANCED SECURITY MODEL," and Provisional U.S. Patent Application No. 63/123,067, filed on Dec. 9, 2020 and entitled "CYBER SECURITY ECOSYSTEM FOR SUPPLY CHAIN ORGANIZATION," which are incorporated herein by reference in their entirety for all purposes.

TECHNICAL FIELD

Embodiments of the disclosure relate generally to cybersecurity, and more specifically, relate to cryptographic secret generation and provisioning.

BACKGROUND

The Internet of Things (IoT) refers to a network of physical objects ("things") that are capable of communicating with each other and/or with other devices over the Internet. Industrial IoT (IIoT) devices can receive and analyze data received from connected equipment, operational technology, etc. to monitor and/or control industrial systems. An industrial control system (ICS) is an integrated hardware/software system that controls the operation of equipment (e.g., machines) within an environment.

SUMMARY

In some embodiments, a system is provided. The system includes a memory device and a processor, operatively coupled with the memory device, to perform operations including receiving, from a device via a brokering agent, a request to provide an encrypted version of a set of secrets data corresponding to a target state of the device, determining whether to authorize the request, and in response to authorizing the request, providing the encrypted version of the set of secrets data and permission to transition to the target state.

In some embodiments, a method is provided. The method includes receiving, by a processor from a device via a brokering agent, a request to initiate a state progression from a current state to a target state, wherein the current state corresponds to a current set of secrets data inserted on the device, determining, by the processor, whether to authorize the request, and in response to authorizing the request, transitioning, by the processor, the device from the current state to the target state.

In some embodiments, a non-transitory computer-readable storage medium is provided. The non-transitory computer-readable storage medium includes instructions that, when executed by a processing device, cause the processing device to perform operations including receiving, from a device via a brokering agent, a request to provide an encrypted version of a set of secrets data corresponding to a target state of the device, determining whether to authorize the request, and in response to authorizing the request, providing the encrypted version of the set of secrets data and permission to transition to the target state.

Numerous other aspects and features are provided in accordance with these and other embodiments of the disclosure. Other features and aspects of embodiments of the disclosure will become more fully apparent from the following detailed description, the claims, and the accompanying drawings.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figures 1, 2:
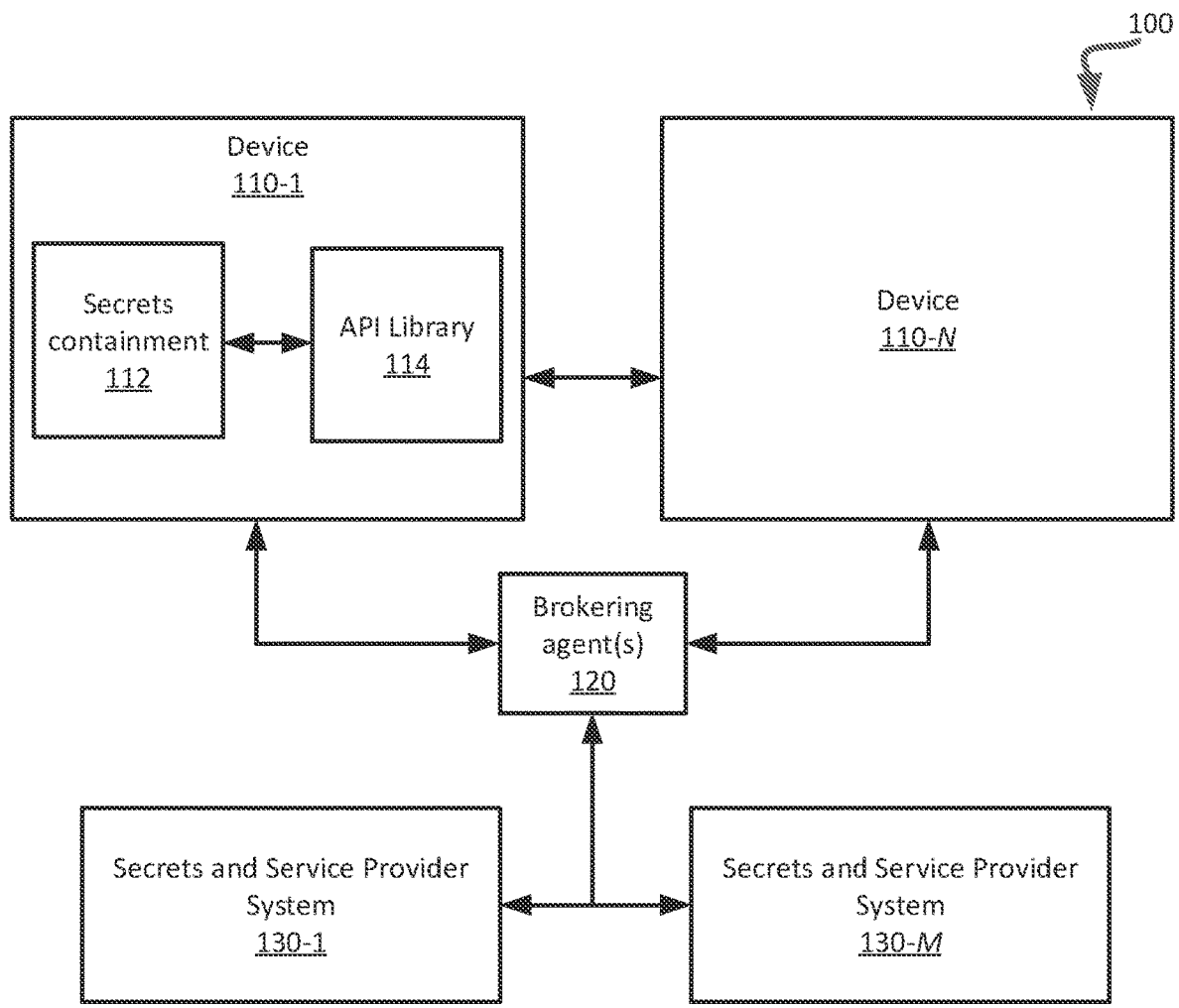
FIG. 1 is a block diagram of an example cybersecurity system, in accordance with some embodiments of the present disclosure.
FIG. 2 is a block diagram illustrating various sets of secrets data that can be inserted onto a cryptographic enabled trust device, in accordance with some embodiments of the present disclosure.

Aspects of the present disclosure are directed to cryptographic trust devices for enabling cybersecurity features. The modern supply chain may be dependent on trustworthy connections that render the Internet interoperable. However, a major challenge of the Internet today is ensuring trust among the various entities interacting within a system. Certain solutions for establishing trust among entities are generally bandage-like solutions and may not provide adequate protection. A network (e.g., industrial network) may not provide sufficient underlying trust in each device within the industrial network. For example, with respect to Internet of Things (IoT) devices, a uniform way does not exist to secure, identify and/or manage such IoT devices as the IoT devices are transferred among various entities throughout the supply chain lifecycle. An IoT device herein refers to an object that is embedded with technology (e.g., sensors, software) to connect and exchange information with other devices and/or systems over a communication network (e.g., Internet). Examples of IoT devices include smartphones, wearable devices (e.g., smartwatches, fitness trackers and medical sensors), voice-controlled digital assistants, etc.

Aspects of the present disclosure address the above and other deficiencies by implementing cryptographic secret generation and provisioning. To do so, a secrets and service provider system can securely generate a set of cryptographic secrets ("secrets data") maintained on the secrets and service provider system, and provision the set of secrets data for insertion onto a cryptographic trust enabled device ("device") upon request. More specifically, the set of secrets data can be maintained on the device within protected memory of a secrets containment component. The secrets and service provider system can be included within a system that communicates with one or more devices and/or one or more other secrets and service provider systems. Transactions performed with respect to the generation and/or provisioning of the set of secrets data can be maintained on a distributed ledger, or other suitable mechanism to ensure record immutability.

The set of secrets data can include a number of secrets components that enable the device to perform a variety of cryptographic functions while the device is in the particular state. For example, the set of secrets data can include a cryptographic key management block including a set of cryptographic key data for the particular state. In some embodiments, the set of secrets data is provided as a non-fungible token (NFT). The set of secrets can be placed on the device while the device is in a particular state. More specifically, the state can correspond to a certain segment of a supply chain in which the device is present. Examples of states include a manufacturer provisioning state in which the device is in possession of a manufacturer, a vendor provisioning state in which the device is in possession of a vendor, an end-use provisioning state in which the device is allocated to at least one end-use segment (e.g., within a network or as a standalone device that uses the end-use provisioning state for communication to resources), and an operational state in which the device is presently operating or functioning within the network. A vendor refers to an entity that can assemble, program and/or handle the physical disposition of a device. Each state can be used to control the insertion and visibility of a corresponding set of secrets data onto the device. For example, the device can maintain a set of vendor provisioning secrets data on protected memory while in the vendor provisioning state to enable the device to perform cryptographic functionality pertaining to the vendor provisioning state, but would be unable to access the set of vendor provisioning secrets data while in the manufacturer provisioning state.

From time to time, as the device progresses throughout the supply chain, the device may transfer possession/ownership between entities. To securely provision secrets at each stage of the supply chain as possession/ownership is transferred, the secrets and service provider system can participate in a process to transition the device from a first state to a second state (e.g., to elevate the device from a current state to a subsequent state, or revert the device from the current state to a previous state). The state transition process is a cryptographically secure process that enables the device to insert a set of secrets data for the second state. The device can maintain a state machine that maintains the state of the device. For example, the state machine can be maintained on the secrets containment component.

The secrets and service provider system can interact with the device to provision the set of secrets data during state transition. To further ensure data integrity and security during the state transition process, a brokering agent can be employed to broker the operations performed between the device and the secrets and service provider system. The brokering agent is a verified trusted entity (e.g., third-party entity) that functions as a proxy between the device and the secrets and service provider system to support cryptographically secure communications via a three-way handshake between the brokering agent, the device and the secrets and service provider system. More specifically, the secrets and service provider system can receive a request from a brokering agent to provide the encrypted version of the set of secrets data for the state transition, the secrets and service provider system can provide the encrypted version of the set of secrets data to the brokering agent for insertion on the device. There can be a number of separate brokering agents that are each responsible for a device while in a particular state. For example, there can be a manufacturing brokering agent, a vendor brokering agent, an end-use brokering agent, an operational brokering agent, etc. To protect other sets of secrets data from extraction after a state transition, the device can cryptographically seal ("seal") the previous set of secrets data corresponding to the previous state by encrypting the previous set of secrets data with a particular encryption key so that it is not obtainable by the entity now in possession of the device. Alternatively, the previous set of secrets data can be deleted after a successful state transition. Accordingly, risk for handling of secrets data at each stage within the supply chain can be deferred to entities that are able to handle and offset such risk, which can enable distributed manufacturing in regions where subcontractors may not be trusted to handle secrets and/or software/firmware components.

The secrets and service provider system can generate a set of secrets data, encrypt the set of secrets data to obtain an encrypted version of the set of secrets data, and maintain the encrypted version of the set of secrets data on encrypted storage. Each set of secrets data can include a number of secrets components. To provide an extra layer of encryption, each of the secrets components can themselves be independently and uniquely encrypted by a respective cryptographic key, and then the entire set of secrets data can be encrypted (e.g., wrapped) to obtain the encrypted version of the set of secrets data. More specifically, a set of secrets data can be generated from a first set of data. The first set of data can include secret data of the secrets and service provider system, public data (e.g., public information provided by a brokering agent), secret device-specific data (e.g., secret device-specific information provided by a brokering agent), and secret organizational data (e.g., secret organization information provided by a brokering agent). For example, the public data, secret device-specific data and/or the secret organization data can be provided via a user interface (e.g., a webpage, a handheld device, a mobile device application). Each type of data can be obfuscated and encapsulated to be verifiable on insertion, and each type of data can be independently and uniquely encrypted by a secrets generator of the secrets and service provider system to generate the set of secrets data. The set of secrets data can then be encrypted by the secrets generator, using a second set of data derived from the secrets generator, to obtain the encrypted version of the set of secrets data. The encrypted version of the set of secrets data can then be ready for transport and storage on a distributed ledger linked to a brokering agent.

After the secrets and service provider system provisions a set of secrets data onto a device, the secrets and service provider system has ownership of the device. Record of the ownership of the device can be maintained in the distributed ledger, along with the secrets data that has been provisioned with the device. With such ownership, the secrets and service provider system can offer one or more cryptographically secure post-secrets-provisioning services (e.g., web services), referred to as consumption as a service. The secrets and service provider system can provide a post-secrets-provisioning service related to a particular device by utilizing a set of secrets data that has (or had been) inserted into the device during secrets provisioning, which can enable the secrets and service provider system to emulate the cryptographic functionality of the device.

Post-secrets-provisioning services can be offered with respect to a large number of use cases. Examples of use cases include data analytics, supply chain security, credential tracking, cybersecurity, forensic tracking and accountability, sensitive or confidential data maintenance or exchange (e.g., intellectual property, private corporate information, confidential or top secret government information), property record maintenance, fraud and waste prevention, audit processes, governance programs, record or tracking and verification, smart contracts, supply chain and product tracking, banking, cryptocurrency, etc. After a post-secrets-provisioning service is provided by the secrets and service provider system, a record of the post-secrets-provisioning service can be placed on a distributed ledger. The record can include a data payload, a timestamp, an identifier of the entity that requested the post-secrets-provisioning service ("requestor"), and the type of post-secrets-provisioning service that was provided.

One example of a post-secrets-provisioning service that can be offered by the secrets and service provider system is an on-demand data and/or trust verification service ("verification service"). The verification service can be used to verify the proof of origin of data upon request. For example, the verification service can be used to verify a prior device configuration.

Another example of a post-secrets-provisioning service that can be offered by the secrets and service provider system is on-demand data production. The data production service can be used to generate data for a device upon request as if it was the device by recreating secrets data. One type of data production service is a data recovery service to recover data that has been lost by the device, such as data that had been encrypted with a previous set of secrets data that is sealed within the device, by having the secrets and service provider system recreate the previous set of secrets data using information maintained on the distributed ledger and/or secrets generator. Another type of data production service is a data access service. The data access service can enable secure access to sensitive data (e.g., sensitive files), which can be subject to a limited use and/or temporal scope for data privacy. For example, the secrets and service provider system can provide an authorized entity (e.g., upon request from the authorized entity) with a set of secrets data for decrypting an encrypted version of data. The set of secrets data can be designed to be valid only during a defined time period to prevent unlimited access to the data, such that the entity will not be able to decrypt the encrypted version of the data outside of the time period.

Another example of a post-secrets-provisioning service that can be offered by the secrets and service provider system is an on-demand file authorization service. The file authorization service is used to authorize a file upon request. To do so, the secrets and service provider system can generate, using a set of secrets data, an authorization packet including an encrypted version of a file, and sending the authorization packet to the device. The authorization packet enables the device to determine whether the encrypted version of the file is valid for decryption by the device. Examples of files that can be authorized using the file authorization service include a document, an application, a consumable data packet, etc.

Another example of a post-secrets-provisioning service that can be offered by the secrets and service provider system is an on-demand installation authorization service. The installation authorization service can be provided by the secrets and service provider system upon request to determine whether to authorize the installation of an application on a device. For example, the installation authorization service can be provided by the secrets and service provider system upon request to determine whether the installation of an application by a vendor while the device is in a vendor provisioning state. In this example, the authorization packet used to determine whether to allow the installation of the application by the vendor can be generated using vendor-generated secrets data, instead of the secrets and service provider system.

Another example of a post-secrets-provisioning service that can be offered by the secrets and service provider system is an on-demand secrets and service provider locator service. The secrets and service provider locator service is a service that, upon receiving a request from a requesting device that a secrets and service provider system is not authorized to handle, locates an authorized secrets and service provider system within the network to handle the request. For example, if a secrets and service provider system does not have ownership over the requesting device (e.g., it did not provisioning the corresponding set of secrets data onto the device, and thus cannot be authorized to mimic the device to handle the request), the secrets and service provider system can contact other secrets and service provider systems within the network to determine an authorized secrets and service provider system to handle the request (e.g., the secrets and service provider system that had provisioned the set of secret data onto the device).

Advantages of the present disclosure include, but are not limited to, uniform secrets provisioning on IoT devices, uniform formatting for cryptographic functions across multiple devices, uniform resetting and/or refactoring of security by deriving and re-provisioning secrets, and improved cybersecurity.

FIG. 1 is a block diagram of an example cybersecurity system ("system") 100 for in accordance with some embodiments of the present disclosure. In some embodiments, the system 100 is an IoT and/or ICS system. As will be described in further detail, the system 100 can implement cybersecurity functionality, including producing uniform security features, synchronize supply chain assets globally, enable cross-industry support, relate processes and visibility of business operations, uniquely link data to sources, enabling tracking and confidential access, etc. All devices in a given end-use segment (for example, a section of smart grid or the computers in a single business) can contain a shared network secret. The shared network secret can be leveraged to generate symmetric keys synchronized across the network, which are in turn used for encryption and message authentication.

As shown, the system 100 can include a number of distributed cryptographic enabled trust devices ("devices") 110-1 through 110-N, set of brokering agents 120, and a number of secrets and service provider systems 130-1 through 130-M. In some embodiments, the devices 110-1 through 110-N include IoT devices and the system 100 can be an IoT system. As will be described in further detail herein, the system 100 can be used to implement supply chain trust management with respect to the devices 110-1 through 110-N. That is, the system 100 can provide "Supply Chain Consumption as a Service" including cryptographic key management to provide separation of functional implementation of private secret programming with respect to each level of the supply chain. For example, the cryptographic key management block for a device can support trust progression throughout the entire lifecycle of the device in a supply chain by supporting cascading trust across all entities (e.g., organizations, companies and/or individuals) which handle manufacturing, vendor, end-use, operational, and end of life (EOL) stages for a device. Each stage of the supply chain (e.g., manufacturing, vendor, end-use, operational, and end-of-life) can correspond to a state of the device.

Each of the devices 110-1 through 110-N can include a secrets containment component to process and maintain secrets data, and an application programming interface (API) library for implementing API methods for establishing cryptographic secure communications with other entities within the system 100. For example, the device 110-1 includes a secrets containment component 112 and an API library 114. The secrets containment component 112 can include a cryptographically-protected memory. The cryptographically-protected memory can be located on a protected integrated circuit, such as a hardened System-on-Chip (SoC), a secure microprocessor, etc.

For example, with respect to the device 110-1, the set of secrets data can corresponding to some state of the device 110-1. In some embodiments, the set of secrets is embodied as a non-fungible token (NFT). More specifically, the state can correspond to a certain segment of a supply chain in which the device is present. Examples of states include a manufacturer provisioning state, a vendor provisioning state, an end-use provisioning state, and an operational state. Each state can be used to control the insertion of a corresponding set of secrets onto the device, such that the insertion of the set of secrets for a particular state places the device in the particular state.

The set of secrets data can include a cryptographic key management block including a number of cryptographic key components to perform a cryptographic function while in the particular state. Cryptographic key management generally refers to the handling, protection, canceling/revocation, transporting or logistical coordination of the cryptographic keys. For example, the device can maintain a set of vendor provisioning secrets data in protected memory while in the vendor provisioning state, but would be unable to access the set of vendor provisioning secrets data while in the manufacturer provisioning state. Each of the devices 110-1 through 110-N can maintain a state machine that can track state progressions of the device, which can enable the provisioning of the device with the appropriate set of components for the particular state. Further details regarding the cryptographic key management block will be described below with reference to FIG. 2.

Each of the secrets and service provider systems 130-1 through 130-M can securely generate and maintain sets of secrets data to be inserted onto at least one of the devices 110-1 through 110-N. Each of the secrets and service provider systems 130-1 through 130-M can be associated with a particular stage of the supply chain. More specifically, one of the secrets and service provider systems 130-1 through 130-M can be a vendor secrets and service provider system, another of the secrets and service provider systems 130-1 through 130-M can be an end-use secrets and service provider system, etc. For example, the vendor secrets and service provider system would be responsible for the set of vendor provisioning secrets data. Any packet created by a secrets and service provider system can be reproduced to enable cross-IUR support.

As will be described in further detail below with reference to FIG. 3, the secrets and service provider system 130-1 can include a secrets generator, encrypted storage, and a distributed ledger system. The secrets generator can securely generate an encrypted version of a set of secrets data, and securely store the encrypted version of the set of secrets of data on the encrypted storage so that it is never obtainable or visible for interception by outside entities. To provide an extra layer of encryption, each of the base components used to generate the set of secrets data can themselves be independently and uniquely encrypted by a respective cryptographic key, and then the entire set of secrets data can be encrypted to obtain the encrypted set of secrets data. The secrets generator can perform encryption/decryption to enable cryptographic functions (e.g., digital signatures) performed by the secrets and service provider system 130-1, and can be embodied as hardware and/or software. In some embodiments, the secrets generator is embodied as a hardware security module (HSM). An HSM is a tamper-resistant computing device that can securely generate and/or manage secrets data (e.g., cryptographic keys).

Each of the secrets and service provider systems 130-1 through 130-M can be used as part of a process to control the provisioning/insertion of sets of secrets data onto the devices 110-1 through 110-N in a manner that maintains data integrity and trust. Provisioning is the process of requesting and inserting keys and a certificate into a device (or emulator). The provisioned set of secrets data can be used to implement cryptographic functionality, as will be described in further detail below. For example, the set of secrets data can include at least one of a cryptographic key for performing encryption during a cryptographic function, a digital certificate for proving ownership of a public key during a cryptographic function, etc. Illustratively, assume that device 110-1 is presently in a first state corresponding to a first segment of the supply chain, but the device 110-1 is now in a second segment of the supply chain. The device 110-1 can then undergo a state transition process to transition the device 110-1 to a second state corresponding to the second segment of the supply chain (e.g., to elevate the device from a current state to a subsequent state, or revert the device from the current state to a previous state). The state transition process is a cryptographically secure process that grants the device 110-1 access to the second set of secrets data. For example, the first state can be a manufacturer provisioning state and the second state can be a vendor provisioning state. As another example, the first state can be the vendor provisioning state and the second state can be an end-use provisioning state. As another example, the first state can be the end-use provisioning state and the second state can be an operational state. However, such examples should not be considered limiting.

For example, during a manufacturing stage of the supply chain for the device 110-1, the device 110-1 can be initially programmed by a corresponding manufacturer to securely manage the cryptographic keys in the device. More specifically, the device 110-1 can have a unique manufacturer-assigned identifier that enables tracking of the device throughout the supply chain. The identification scheme used by a manufacturer can be maintained as a private manufacturer secret to prevent cyber-attacks within the system 100. During the vendor stage of the supply chain, the device 110-1 can then be transferred between one or more vendors. During the end-use state of the supply chain, the device 110-1 can be assigned to one or more end-use segments. During the operation state of the supply chain, the device 110-1 can be placed into an operational state.

To undergo the state transition process, the device 110-1 can receive the encrypted version of the set of secrets data for the second state from the secrets and service provider system 130, and transition to the second state upon receipt of the encrypted version of the set of secrets data. To provide a layer of cryptographic security, the device 110-1 and the secrets and service provider system 130 are not placed in direct communication. To enable such indirect communication, a brokering agent of the set of brokering agents 120 can be employed to securely broker the transaction between the device 110-1 and the secrets and service provider system 130. The set of brokering agents 120 can include a number of separate brokering agents that are each responsible for a device. For example, there can be a manufacturing brokering agent, a vendor brokering agent, an end-use brokering agent, etc. Each brokering agent is a certified third party entity that functions as a broker or proxy between the device 110-1 and the secrets and service provider system 130 to support cryptographically secure communications via a three-way handshake between the brokering agent 120, the device 110-1 and the secrets and service provider system 130. For example, a brokering agent of the set of brokering agents 120 can be included as a web service. A brokering agent of the set of brokering agents 120 can be licensed to a third-party within the system 100 to provide individualized brokering services within the system 100.

For example, the brokering agent can issue a request to the secrets and service provider system 130, on behalf of the device 110-1, to transition the device to the second state (e.g., elevate to or revert back to the second state). In response, the secrets and service provider system 130 can issue a challenge package to the brokering agent in order to authenticate the brokering agent as being a valid brokering agent to handle the request on behalf of the device. For example, the challenge can be based on an internal secret of the device 110-1 that only an authorized entity, such as the brokering agent, would have knowledge of. The brokering agent can provide a response back to the secrets and service provider system 130. If the response does not authenticate the brokering agent, then the brokering agent cannot be trusted and the process ends. If the response authenticates the brokering agent, then the secrets and service provider system 130 can provide a response that places the device in a state for transitioning to the second state. Then, the brokering agent can issue a request to the secrets and service provider system 130 for the encrypted version of the set of secrets data to be inserted into the device 110-1 for transitioning to the second state. The secrets and service provider system 130 can then provide the encrypted version of the set of secrets data to the brokering agent 120, which then forwards the encrypted version of the set of secrets data to the device 110-1 for secure storage on the device 110-1.

However, before the set of secrets data can be stored in the protected memory of the secrets containment component 112 for use, the device 110-1 first needs to be granted permission transition to the target state. In some embodiments, the device 110-1 can enter a supersession state, in which the device generates a supersession package. The supersession package is a set of data that is used to determine whether the device 110-1 has authority to supersede or overwrite a current set of secrets data corresponding to the current state of the device 110-1 with the set of secrets data corresponding to the target state. The supersession package can be forwarded to the secrets and service provider system 130 via the brokering agent. In response to determining that the device 110-1 has permission to transition to the target state (e.g., determining that supersession package is valid), the secrets and service provider system 130 can notify the device 110-1 that it has permission to transition to the target state. In some embodiments, the secrets and service provider system 130 can send a commit package to the device 110-1 via the brokering agent. The commit package is a set of data that is generated by the secrets and service provider system 130 as a response that confirms that the device has authority to supersede or overwrite the current set of secrets data with the set of secrets data corresponding to the target state. To prevent replay attacks and to ensure that the provisioning steps are called in order during a single session, one or more of the packages generated by the device 110-1 and/or the secrets and service provider system 130 can be generated based on content of the previously generated packages.

Storing the set of secrets data can include obtaining a decrypted version of the set of secrets data (e.g., locally decrypting the encrypted version of the set of secrets data), storing the decrypted version of the set of secrets data in the protected memory of the secrets containment component 112, cryptographically sealing the previous set of secrets data of the prior state, and updating a state maintained by a state machine to reflect the transition to the target state. Obtaining the decrypted version of the set of secrets data can include locally decrypting the encrypted version of the set of secrets data. For example, the keys needed to perform the decryption can be made available to the device 110-1 upon successful transition to the target state. Updating the state can include incrementing a programming sequence count with respect the state machine. Accordingly, the device 110-1 can be securely programmed by entities which possess its internal secret, and control of the device 110-1 can be securely transferred to entities as ownership of the device 110-1 is transferred between the entities throughout the supply chain lifecycle.

As will be described in further detail below with reference to FIG. 3, the secrets and service provider system 130 can store transaction data on a distributed ledger system. The distributed ledger system can maintain transactions relating to, e.g., entry of a device/chip with an identifier to the system 100, provisioning of secrets on devices, requests for restricted information from entities external to the system 100, registration of valid brokering agents, installation of registered software and/or software updates, transfer of device ownership (e.g., responsible party), registering network affiliations, and regression, resetting, removal or end-of-life of a device at any stage. For example, the secrets and service provider system 130 can provide record of the completed state transition on the distributed ledger system. The immutable storage of the transaction data on the distributed ledger system ensures legitimacy and authenticity of the encrypted provisioning data. Accordingly, the distributed ledger system can provide verifiable trust and support proof of origin for all transactions performed by the secrets and service provider system 130 within the system 100.

The API library of each of the devices 110-1 through 110-N (e.g., API library 114) can function to provide secure communications between other ones of the devices 110-1 through 110-N and/or the secrets and service provider systems 130-1 through 130-M For example, each API library (e.g., .so or .dll) can maintain a set of APIs to implement various services using a set of secrets corresponding to the particular one of the devices 110-1 through 110-N. A secrets and service provider system (e.g., the secrets and service provider system 130-1) can recreate the API library for a device as necessary to provide a post-secrets-provisioning service (e.g., data verification, data production, file authorization, application authorization).

FIG. 2 is a diagram 200 illustrating various types of sets of secrets data, in accordance with some embodiments. Each set of secrets data can be provisioned on a device (e.g., IoT device) can include a cryptographic key management block to enable cybersecurity features during a corresponding device state. For example, the device state can correspond to a stage within the supply chain lifecycle of the device. For example, the diagram 200 shows of a set of manufacturer provisioning secrets data 210 that can be provisioned on a device during a manufacturing stage of the device in the supply chain, a set of vendor provisioning secrets 220 that can be provisioned on the device during a vendor stage of the device in the supply chain, a set of end-use provisioning secrets data 230 that can be provisioned on the device during a end-use stage of the device in the supply chain, a set of operational secrets data 240 that can be provisioned on the device during an operation stage of the device within the supply chain, a set of end-of-life secrets provisioning data 250. In some embodiments, each of the sets of secrets data 210-250 can be embodied as an NFT. Moreover, each of the sets of secrets data 210-250 can be recorded on a distributed ledger of a secrets and service provider system for immutability.

The set of manufacturer provisioning secrets data 210 can include original manufacturer secrets that can be placed on the device directly by the manufacturer. For example, the set of manufacturer provisioning secrets data 210 can include a device identifier associated with the manufacturer (UID), and a provisioning transport key. The provisioning transport key, which can also be referred to as a key wrapping key or a key encryption key, is used to wrap a secret key to maintain confidentiality and authenticity during transportation of the secret key. The provisioning transport key can also be used for authentication and transport of a device's new privacy and boot verification secrets during vendor state reprogramming. For example, the provisioning transport key can hold a lot number between manufacturing and assignment to the device's first vendor. During a state progression of the device from the manufacturer state to the vendor state, the secrets and service provider system (e.g., the secrets and service provider system 130) can take ownership and overwrite the provisioning transport key of the set of manufacturer provisioning secrets data 210 to become a (primary) supply chain registrar.

The set of vendor provisioning secrets data 220 can include cryptographic data components specific to a vendor that is in possession of the device. When transitioning to the vendor provisioning state, the original manufacturer secrets are overwritten with the set of vendor provisioning secrets data. If the control of the device is being transferred from an old vendor to a new vendor, the set of old vendor provisioning secrets data is replaced by the set of new vendor provisioning secrets data, and the set of old vendor provisioning secrets data is maintained on the distributed ledger.

The set of vendor provisioning secrets data 220 can include cryptographic data components such as a vendor certificate (e.g., vendor signed certificate), a set of private keys (e.g., private signing key and private encryption key), a vendor configuration, etc.

The set of end-use provisioning secrets data 230 can include cryptographic data components that can be linked to a particular network or product line, and can support cryptographic communications, trust root, and extended security/privacy features for physical security and logical data operations. For example, the set of end-use provisioning secrets data 230 can include a network certificate (e.g., certificate authority (CA) signed), a network exchange key for securely exchanging keys over a public network (e.g., Diffie-Hellman network exchange key), and symmetric secrets (e.g., network segment global secret, network sub-segment secrets, an authentication key, a privacy secret, and network segment derivation data). For example, if a new network is reprogrammed while the device is in the end-use provisioning state, the new network can be added to the device along with the old networks. The device can maintain a certain number of networks based on device memory specifications.

The operational state can enable generation of derived use secrets and ephemeral use (e.g., one-time use) keys during device operation. The set of operational secrets data 240 can be utilized for extending and augmenting operations performed by the device by creating derived or temporary use components. For example, the set of operational secrets data 240 can include a derived network secret, a network operation secret, a roll network key, and network segment derivation data (e.g., derivation timing, key supersession, roll number, key exchange timestamp). The set of operational secrets data 240 can be re-provisioned when adding another network segment, or replacing a compromised network segment.

The set of end-of-life provisioning secrets data 250 can support the removal of the device from the supply chain, and can provide solutions similar to certificate revocation with the expanded revocation of right-to-operate or removal of trusted status. The set of end-of-life provisioning secrets data 250 can include modified versions of the cryptographic components 210-240. In alternative embodiments, the set of end-of-life provisioning secrets data 250 can be provisioned separately from the device, such that the device does not store the set of end-of-life provisioning secrets data 250 locally on its protected memory. A device cannot be forced into end-of-life, but other entities within the system can be informed that the device should be treated as an end-of-life device.

Figure 3:
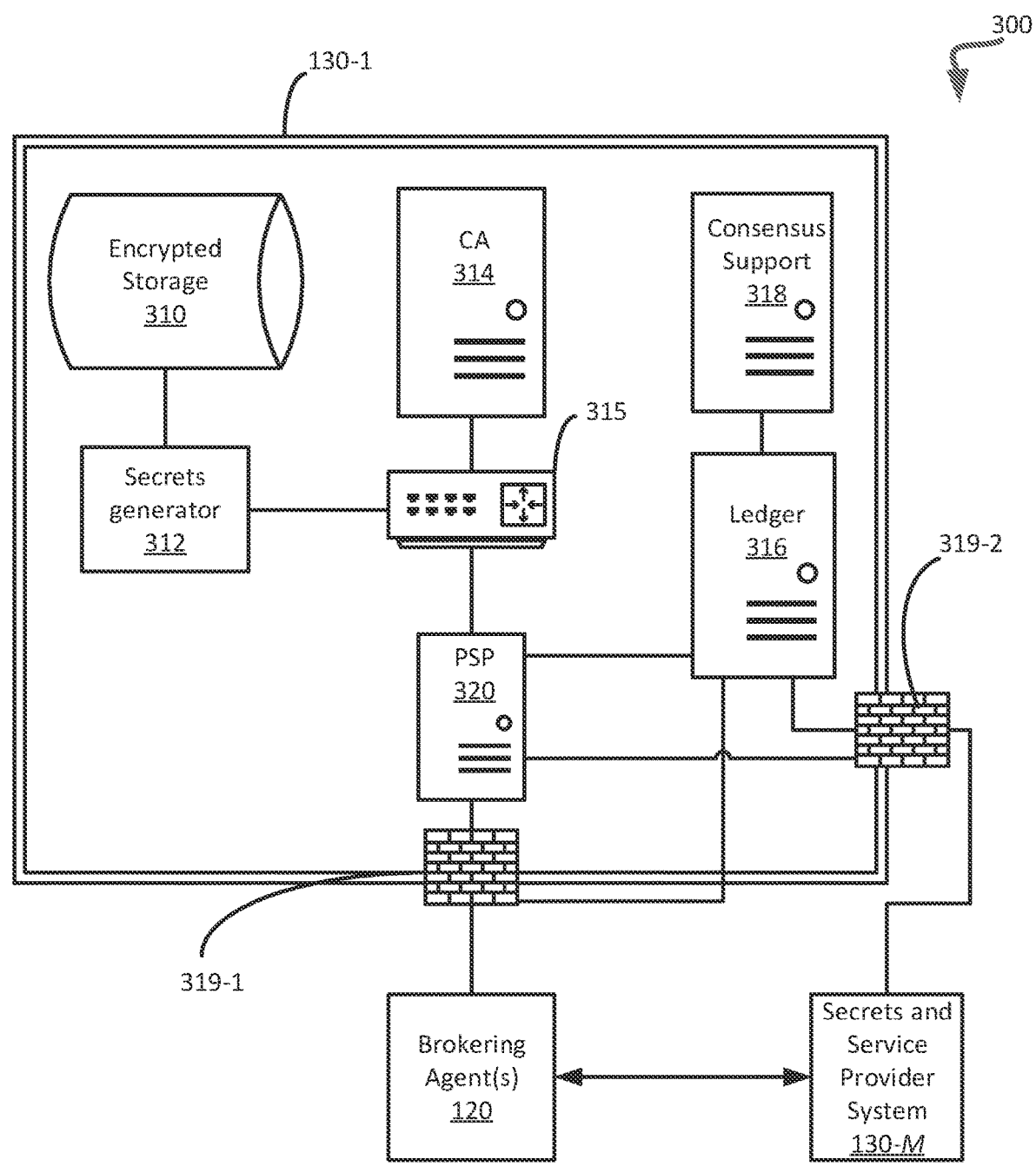
FIG. 3 is a block diagram of an example system including a secrets and service provider system, in accordance with some embodiments of the present disclosure.

FIG. 3 is a block diagram of an example system 300 for provisioning secrets data, in accordance with some embodiments of the present disclosure. The system 300 includes the secrets and service provider systems 130-1 through 130-M and the set of brokering agents 120, as described above with reference to FIG. 1. The design of the system 300 provides a separation of functionality between internal operations each of the secrets and service provider systems 130-1 through 130-M, and external operations with respect to other entities of the system 300.

For example, as shown, the secrets and service provider system 130-1 includes encrypted storage 310 (e.g., encrypted UID indexed logistics storage), a secrets generator 312 in communication with the encrypted storage 310, and a certificate authority (CA) 314 for maintaining a digital or public key certificate (e.g., X.509 certificate).

The secrets generator 312 can be embodied as a software secrets generator or a hardware secrets generator. In some embodiments, the secrets generator 312 includes a hardware security module (HSM). An HSM is a tamper-resistant computing device that can generate and/or manage cryptographic keys, and can perform encryption/decryption to enable cryptographic functions (e.g., digital signatures) performed by the secrets and service provider system 130-1. For example, when a cryptographic trust enabled device ("device") is progressing from a first state to a second state, the secrets generator 312 can transfer an encrypted version of the set of secrets data of a cryptographic key management block corresponding to the second state for insertion onto the device. For example, if the device transitions from a manufacturer provisioning state to a vendor provisioning state, the secrets generator 312 can transfer and program the corresponding set of vendor provisioning data of the cryptographic key management block. Additionally, the secrets generator 312 can recreate sets of secrets data for a device (e.g., the device 110-1 of FIG. 1) in order to enable the secrets and service provider system 130-1 to provide a service by emulating the device utilizing the set of secrets data.

The secrets and service provider system 130-1 can further include a distributed ledger ("ledger") platform 316 (e.g., server) in communication with a consensus support platform 318 (e.g., server), collectively forming a distributed ledger system. The distributed ledger platform 316 can maintain a public ledger of records, including records relating to the generation and/or provisioning of sets of secrets data. The consensus support platform 318 can implement a consensus mechanism or protocol. Other ones of the secrets and service provider systems 130-2 through 130-M include their own distributed ledger systems to maintain their own copies of the distributed ledger and implement the consensus mechanism (e.g., peer nodes of the distributed ledger network). The distributed ledger platform 316 can maintain records of transactions relating to, for example, entry of a device/device with an identifier, provisioning of secrets packages, requests for restricted information from entities external to the system 300, registration of valid brokering agents, installation of registered software and/or software updates, transfer of device ownership (e.g., responsible party), registering network affiliations, and regression, resetting, removal or end-of-life (EOL) of a device at any stage. The distributed ledger can be used to provide a service by emulating the device utilizing a set of secrets data corresponding to the device. For example, the secrets and service provider system 130-1 can receive information related to obtaining and/or recreating the set of secrets data from the distributed ledger, and can use the distributed ledger to prove ownership of the device for service provider authorization.

The secrets and service provider system 130-1 can further include a provisioning service provider (PSP) 320 in communication with the distributed ledger platform 316. The PSP 320 can communicate with the set of brokering agents 120 to provision sets of secrets data onto respective devices (e.g., the device 110-1 of FIG. 1) and/or provide post-secrets-provisioning services for respective devices. The secrets generator 312, the CA 314, and the PSP 320 are each in communication with a central routing device 315. The central routing device 315 can maintain minimal functionality for decisions and triggering flow of operations within the secrets and service provider system 130-1.

Access control interfaces 319-1 and 319-2 are also provided to allow or restrict access to the distributed ledger platform 316 and/or the PSP 320, respectively. That is, the access control interfaces 319-1 and 319-2 can function as firewalls for the secrets and service provider system 130-1. For example, the access control interface 319-1 can allow or restrict access to outside brokering agents, and the access control interface 319-2 can allow or restrict access to other secrets and service provider systems (e.g., secrets and service provider system 130-M).

The registration process for adding new brokering agents to the set of brokering agents 120 can be maintained and controlled by a distributed ledger consortium of the system 300. The distributed ledger consortium can address how the secrets and service provider systems 130-1 through 130-M can maintain trust for the set of brokering agents 120 and allow for cross-brokering-agent support.

A brokering agent of the set of brokering agents 120 can communicate with the PSP 320 to request a set of secrets data on behalf of a device (e.g., the device 110-1 of FIG. 1). For example, as described above with reference to FIG. 1, the secrets and service provider system 130-1 can authenticate the brokering agent (e.g., using a multi-factor authentication process). After the authorization process indicates that the brokering agent is authorized, the PSP 320 can initiate a timed API sequence to implement the service. That is, the brokering agent can function as trusted interface for the API method flow between the secrets and service provider system and the device. The secrets and service provider system 130-1 can then place a record of the transaction on the distributed ledger maintained by the distributed ledger platform 316. The record can include proof relating to the authentication of the brokering agent and the state of the device. Once the sequence is complete, the brokering agent can close out the session with the secrets and service provider system 130-1, and the brokering agent can cease communication with the device.

The system 300 can be used to support and control the progression of states of the device throughout the supply chain lifecycle of the device. For example, the secrets and service provider system 130-1 can maintain a log of the current state of the device using the distributed ledger platform 316 and map its state change progression within the encrypted storage 310. For example, the device can be in a manufacturer provisioning state corresponding to the manufacturing stage of the supply chain of the device, a vendor provisioning state corresponding to the vendor stage of the supply chain of the device, an end-use provisioning state corresponding to a end-use stage of the supply chain of the device, or an operational state corresponding to an operational stage of the supply chain of the device. The secrets and service provider system 130-1 can be used to control the provisioning of secrets onto the device, which can be used to transition ownership/accountability at each stage of the supply chain to the appropriate entity (e.g., manufacturer, vendor). For example, the secrets and service provider system 130-1 can transfer ownership/accountability of the device from an old vendor to a new vendor. As another example, when transitioning the device from the vendor stage to an end-use network, the secrets and service provider system 130-1 can seal, restrict and/or remove the corresponding set of vendor provisioning secrets data. Further details regarding the operation of the secrets and service provider system 130-1 to generate a set of secrets data will be described in further detail below with reference to FIG. 4, and further details regarding the operation of the secrets and service provider system 130-1 to provision the set of secrets data onto a device will be described in further detail below with reference to FIGS. 5-6.

Figure 4:
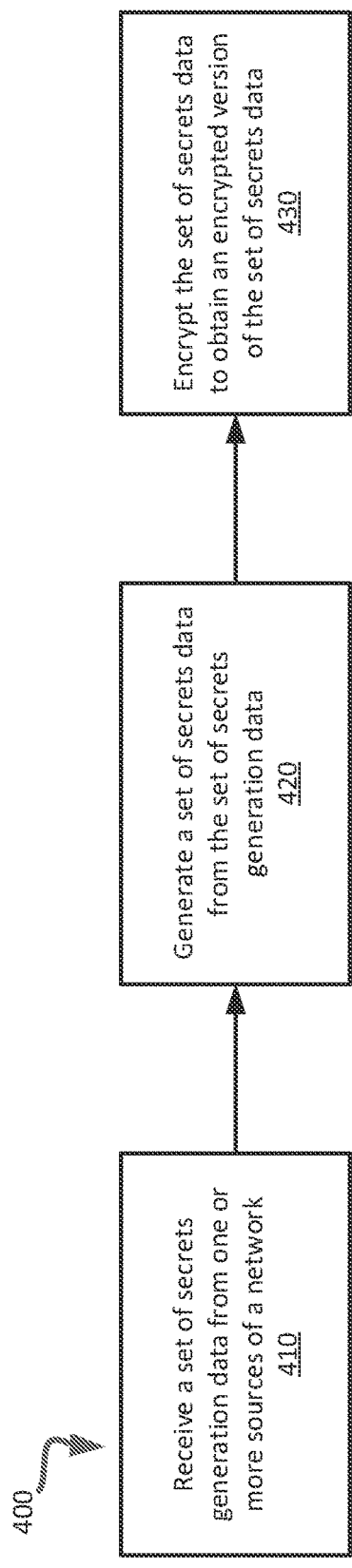
FIG. 4 is a flow diagram of a method for to generate an encrypted version of a set of secrets data for insertion onto a device, in accordance with some embodiments of the present disclosure.

FIG. 4 is a flow diagram illustrating a method 400 to generate an encrypted version of a set of secrets data for insertion onto a device, in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 400 can be performed by processing logic implementing the device (e.g., the secrets and service provider system 130-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic receives a set of secrets generation data from one or more sources of a network. The set of secrets generation data can include a combination of public data and private data related to cryptographic key management. For example, the set of secrets generation data can include private information generated by a secrets and service provider system of the network, public information received from a brokering agent of the network authorized to broker transactions between a device of the network (e.g., IoT device) and the secrets and service provider system, and private information received from the brokering agent. Examples of private information received from the brokering agent include confidential device-specific information provided by the device, and confidential organizational information from one or more organizations involved within the network. The data from the brokering agent can be received via a user interface, such as a webpage, a handheld device, a mobile device application, etc.

At operation 420, the processing logic generates a set of secrets data from the set of secrets generation data. For example, a secrets generator of the secrets and service provider system can generate the set of secrets data. Generating the base set of secrets data can include encrypting the base set of secrets data. For example, the base set of secrets data can be generated by obfuscating each element of the set of secrets generation data to obtain obfuscated data, encapsulating the obfuscated data to be verifiable upon insertion in the device to obtain encapsulated data, and encrypting the encapsulated data to obtain the base set of secrets data. Obfuscation refers to the transformation of data, without utilizing a cryptographic key, into a format that is difficult for others to understand. That is, the obfuscation operation is itself the secret. Although obfuscation does not encrypt data, obfuscation can help against reverse engineering. Encapsulation refers to the wrapping or binding of data components into a single capsule or unit in order to hide specific details of the individual data components.

At operation 430, the processing logic encrypts the set of secrets data to obtain an encryption version of the set of secrets data. The set of secrets data can be encrypted using a key known by the secrets and service provider system. For example, the key can be maintained by the secrets generator. The encrypted version of the set of secrets data can be used for transport for insertion onto a device, and can be stored on a distributed ledger of the secrets and service provider system. For example, the encrypted version of the set of secrets data can be linked to a brokering agent using the distributed ledger.

The encrypted version of the set of secrets data can corresponding to a state of a device. In some embodiments, the state can correspond to a supply chain state of the device within a supply chain. For example, the state can be a manufacturer provisioning state corresponding to a manufacturing stage of the supply chain associated with the device manufacturer, a vendor provisioning state corresponding to a vendor stage of the supply chain associated with a vendor in possession of the device, an end-use provisioning state corresponding to an end-use stage (e.g., network stage) of the supply chain, an operational state corresponding to an operational stage of the supply chain, etc. The encrypted version of the set of secrets data can include a set of manufacturer provisioning secrets data, a set of vendor provisioning secrets data, a set of network provisioning secrets data, or a set of operational secrets data. The brokering agent can be at least one of a manufacturer brokering agent, a vendor brokering agent, an end-use brokering agent, an operational brokering agent, etc. Further details regarding operations 410-430 are described above with reference to FIGS. 1-3 and described herein below.

Figure 5:
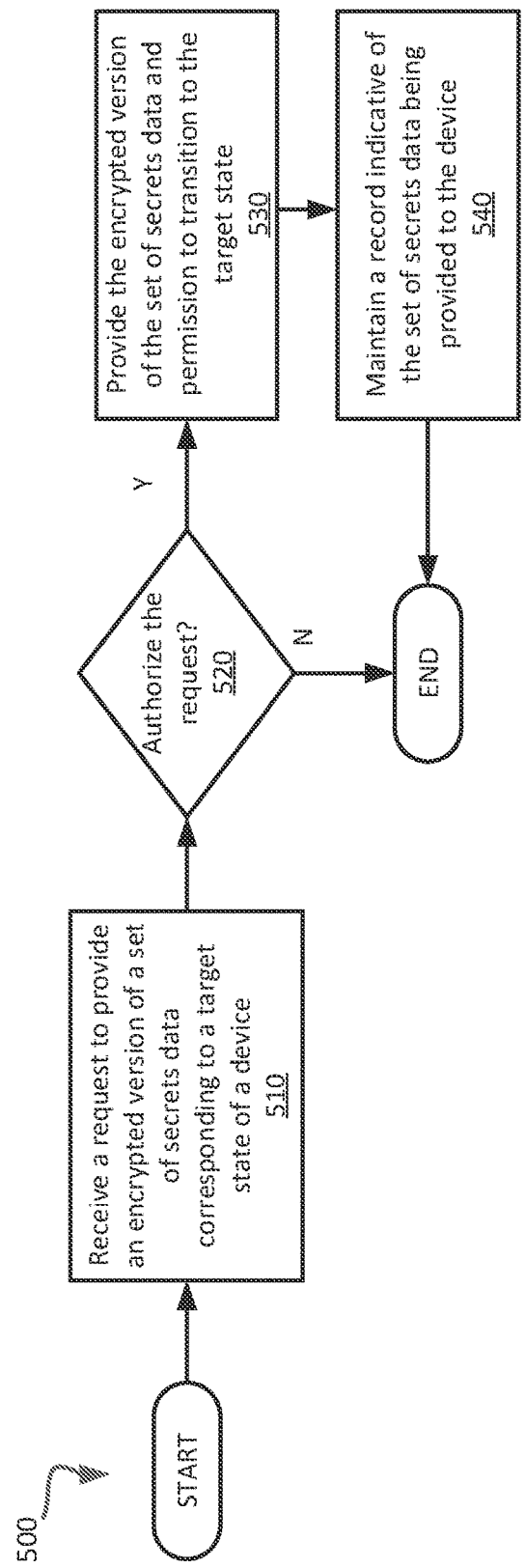
FIG. 5 is a flow diagram of a method to provision an encrypted version of a set of secrets for insertion onto a device, in accordance with some embodiments of the present disclosure.

FIG. 5 is a flow diagram illustrating a method 500 to provision an encrypted version of a set of secrets data for insertion onto a device, in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 500 can be performed by processing logic implementing the device (e.g., the secrets and service provider system 130-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic receives a request to provide an encrypted version of a set of secrets data corresponding to a target state of a device. For example, the request can be a request to initiate a state progression sequence from a current state of the device to the target state of the device. The request can be received from a brokering agent on behalf of the device.

In some embodiments, the states correspond to respective supply chain states of the device within a supply chain. For example, the current state can be a manufacturer provisioning state corresponding to a manufacturing stage of the supply chain associated with the device manufacturer, a vendor provisioning state corresponding to a vendor stage of the supply chain associated with a vendor in possession of the device, an end-use provisioning state corresponding to a end-use stage of the supply chain, an operational state corresponding to an operational stage of the supply chain, etc. The state progression sequence can include a transition from the manufacturer provisioning state to the vendor provisioning state, a transition from the vendor provisioning state to the end-use provisioning state, or a transition from the end-use provisioning state to the operational state. The encrypted version of the set of secrets data can include a set of manufacturer secrets data, a set of vendor secrets data, a set of end-use secrets data, or a set of operational secrets data. The brokering agent can be at least one of an manufacturer brokering agent, a vendor brokering agent, an end-use brokering agent, an operational brokering agent, etc.

At operation 520, the processing logic determines whether to authorize the request. Determining whether to authorize the request can include determining whether the brokering agent is authorized to handle the request on behalf of the device. If the brokering agent is not authorized to handle the request, then the processing logic denies access to the encrypted version of the set of secrets by not providing the encrypted version of the set of secrets data to the brokering agent on behalf of the device, maintains a record on the distributed ledger that access to the encrypted version of the set of secrets data has been denied, and the process ends. That is, the processing logic prevents the device from transitioning to the target state.

If the brokering agent is authorized to handle the request, determining whether to authorize the request further includes receiving, from the device via the brokering agent, a request for permission to transition to the target state. In some embodiments, receiving the request for permission to transition to the target state comprises receiving a supersession package. The supersession package is a set of data that is used to determine whether the device has authority to supersede or overwrite a current set of secrets data corresponding to the current state of the device with the set of secrets data corresponding to the target state. The device can generate the supersession package while the device is placed in a supersession state. If the processing logic determines that the device does not have permission to transition to the target state (e.g., by determining that the device does not have authority to supersede the current set of secrets data based on the supersession package), then the processing logic denies access to the encrypted version of the set of secrets by not providing the encrypted version of the set of secrets data to the brokering agent on behalf of the device, maintains a record on the distributed ledger that access to the encrypted version of the set of secrets data has been denied, and the process ends.

Otherwise, at operation 530, the processing provides, to the device via the brokering agent, the encrypted version of the set of secrets data and permission to transition to the target state. For example, the encrypted version of the set of secrets data can be provided to the device after determining that the brokering agent is authorized to handle the request, or after determining that the device has permission to transition to the target state. In some embodiments, providing permission to transition to the target state can include sending, to the device via the brokering agent, a commit package to commit the set of secrets data. The commit package is a set of data that is generated as a response to the supersession package that confirms that the device has authority to supersede or overwrite the current set of secrets data with the set of secrets data corresponding to the target state.

At operation 540, the processing logic maintains a record indicated of the set of secrets data being provided to the device. For example, the record can be maintained on a distributed ledger of the secrets and service provider system. Further details regarding operations 510-540 are described above with reference to FIGS. 1-4 and will be described below with reference to FIG. 6.

Figure 6:
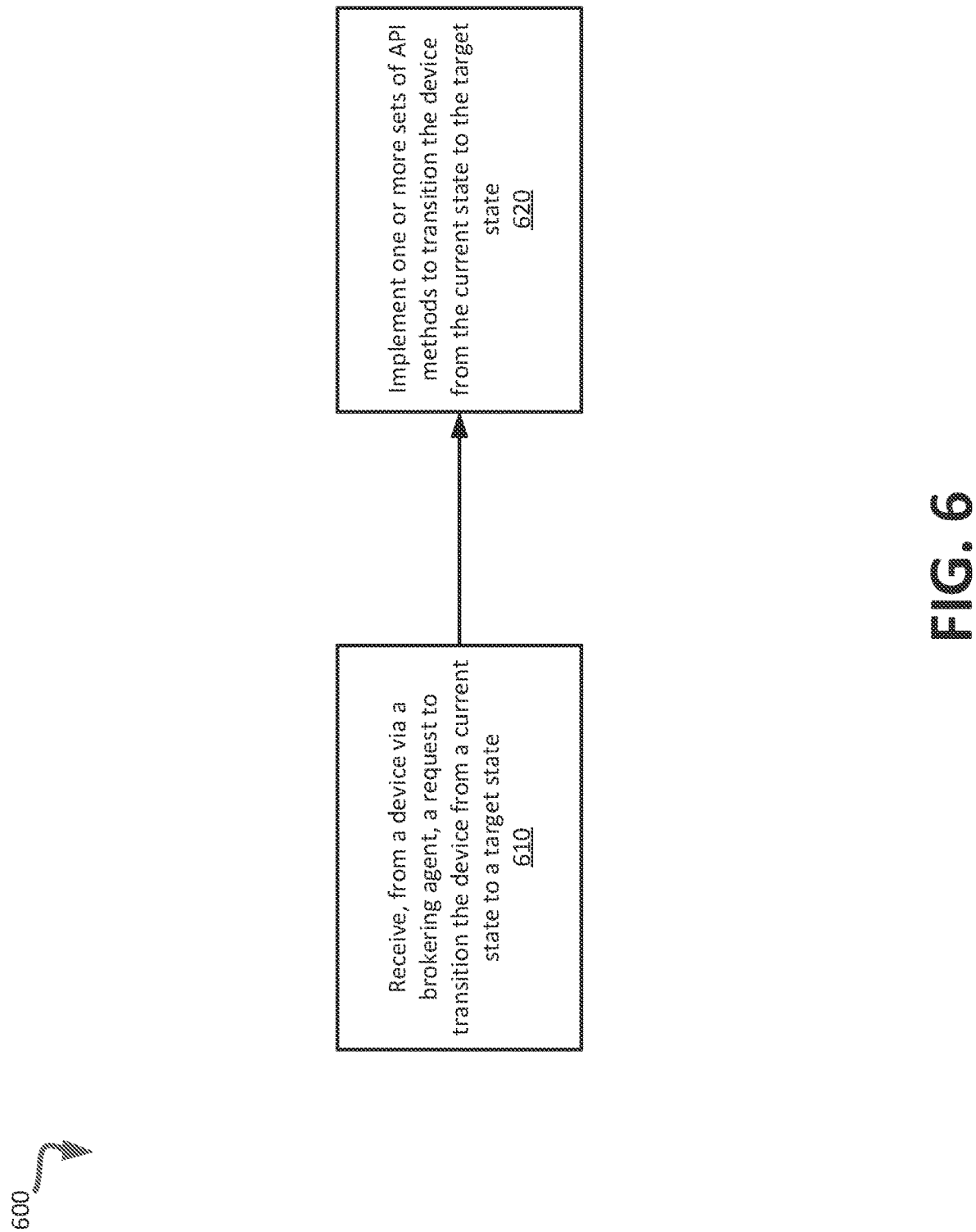
FIG. 6 is a flow diagram illustrating a method for implementing a cryptographically secure device management system, in accordance with some embodiments of the present disclosure.

FIG. 6 is a flow diagram of a method 600 for implementing a cryptographically secure device management system, in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. For example, the method 600 can be performed by processing logic implementing a secrets and service provider system (e.g., the secrets and service provider system 130-1 of FIG. 1). Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing logic receives, from a device via a brokering agent, a request to transition the device from a current state to a target state. In some embodiments, the provisioning states correspond to respective supply chain states of the device within a supply chain. For example, the current state can be a manufacturer provisioning state corresponding to a manufacturing stage of the supply chain associated with the device manufacturer, a vendor provisioning state corresponding to a vendor stage of the supply chain associated with a vendor in possession of the device, an end-use provisioning state corresponding to a end-use stage of the supply chain, an operational state corresponding to an operational stage of the supply chain, etc. The state progression sequence can include a transition from the manufacturer provisioning state to the vendor provisioning state, a transition from the vendor provisioning state to the end-use provisioning state, or a transition from the end-use provisioning state to the operational state. In some embodiments, the request includes a request for insertion of a set of secrets data into the device. The set of secrets data can include a set of manufacturer provisioning secrets data, a set of vendor provisioning secrets data, a set of end-use provisioning secrets data, a set of operational secrets data, etc. The brokering agent can be at least one of a manufacturer brokering agent, a vendor brokering agent, an end-use brokering agent, an operational brokering agent, etc. Further details regarding operation 610 are described above with reference to FIGS. 1-5.

At operation 620, the processing logic implements a progression sequence to transition the device from the current state to the target state. The progression sequence can perform a number of sets of API methods, where each set of API methods is used to transition the device to a next sub-state upon completion of a final API method of the set of API methods. For example, the progression sequence can be used to insert the set of secrets data corresponding to the target state onto the device, and seal the set of secrets data corresponding to the current state.

One example of a progression sequence that can be performed at operation 620 is a progression sequence from a manufacturer provisioning state to a base provisioning state. While the device is in the manufacturer provisioning state, the secrets and service provider system can receive the lot information of the device from the manufacturer of the device. A first set of API methods can be implemented for transitioning the device to a Do Manufacturer Programming sub-state. For example, the first set of API methods can include "Read Device UID," "Read Manufacturer Programming Count," "Return Device State," "Read Configuration Signature," and "Do Manufacturer Programming." The API method "Read Device UID" receives a formatted message from the brokering agent for the device and returns a response with an identifier of the device (e.g., UID). The API method "Read Manufacturer Programming Count" passes a properly formatted message from the brokering agent for the device and returns a current number of manufacturing programming counts. A manufacturing programming count is an openly-readable number corresponding to a number of times that the manufacturing programming method has been successfully completed. The API method "Return Device State" is generally available to return a current state of the device. This API method can be equipped with a timer as to how often it can be called to ensure that repeated calling does not interfere with the operation of the device, but also that it cannot be a feature used for an attack (e.g., Denial of Service attack). The API method "Read Configuration Signature" is generally available to return a hash value of the current configuration of the contents of memory of the device. This method can also be equipped with a timer as to how often it can be called to ensure that repeated calling does not interfere with the operation of the device, but also that it cannot be a feature used for an attack (e.g., Denial of Service attack). The API method "Do Manufacturer Programming" is called during the programming sequence and is passed authentication credentials from the manufacturer. This API method can enable the device to receive contents upon calling the "Receive Encrypted Stream" API method, as will be described in further detail below.

While the device is in the Do Manufacturer Programming sub-state, a second set of API methods can be implemented for transitioning the device to a Post Stream Received sub-state. For the example, the second set of API methods can include "Read Device UID," "Read Programming Count Pre," "Read Programming Count Post," "Return Device State," and "Receive Encrypted Stream." An encrypted version of the set of manufacturer provisioning secrets data can be received from encrypted storage of the secrets and service provider system (e.g., encrypted storage 310 of FIG. 3). The API method "Read Programming Count Pre" is active after "Do Manufacturer Programming" is called and before its timeout is reached. This API method can be used during a supersession sequence when two sets of Manufacturer Programming Count records exist. This API method returns a current Manufacturer Programming Count (as opposed to a temporary value which is in the process of being promoted). The API method "Read Programming Count Post" is also active after "Do Manufacturer Programming" is called and before its timeout is reached, and can used during a supersession sequence and when two sets of Manufacturer Programming Count records exist. In contrast to "Read Programming Count Pre," this API method returns a new temporary value which is in process of being promoted (not the current Manufacturer Programming Count). The API method "Receive Encrypted Stream" is called after "Do Manufacturer Programming" before its timeout is reached. This API method can receive an encrypted stream including the encrypted version of the set of manufacturer provisioning secrets data. The encrypted stream can further include a checksum for proper insertion onto the device. The device can then be placed in a "Verify State" with a timeout for verification. After performing the "Receive Encrypted Stream" API method, it is determined if programming is complete. If not, the progression sequence can revert the device back to the manufacturer provisioning state. If so, the progression sequence can transitions the device to the Post Stream Received sub-state.

While the device is in the Post Stream Received sub-state, a third set of API methods can be implemented for transitioning the device to a Verify Manufacturer Secrets sub-state. For example, the third set of API methods can include "Read Device UID," "Read Programming Count Pre," "Read Programming Count Post," "Return Device State," and "Verify Manufacturer Initial Program." A configuration verification stream can also be sent to a manufacturer brokering agent. The API method "Verify Manufacturer Initial Program" can be called after "Receive Encrypted Stream" while in the device is in a Verify State. A Verify State check can be performed for supersession requirements, and the device can be placed in a Waiting Commit State to wait for a determination of whether a commit has been received. If not, the progression sequence can revert the device back to the manufacturer provisioning state. If so, the progression sequence can transition the device to the Verify Manufacturer Secrets sub-state.

While the device is in the Verify Manufacturer Secrets sub-state, a fourth set of API methods can be implemented for transitioning the device to the base provisioning state. For example, the fourth set of API methods can include "Read Device UID," "Read Programming Count Pre," "Read Programming Count Post," "Return Device State," and "Commit Base Provisioning Supersession." The API method "Commit Base Provisioning Supersession" can be called after "Verify Manufacturer Initial Program" to commit the programming change to the device. To perform "Commit Base Provisioning Supersession," a Supersession Commit Packet can be received (e.g., from the manufacturer brokering agent). After performing "Commit Base Provisioning Supersession," the progression sequence transitions the device to the base provisioning state.

Now that the device is in the base provisioning state, ownership of the device is assigned to the secrets and service provider system. Control and accountability of the device in the base provisioning state can then be assigned to the manufacturer brokering agent. Disposition of the device while in the base provisioning state is the responsibility of the manufacturer brokering agent until ownership of the device is transferred to another entity.

Another example of a progression sequence that can be performed at operation 620 is a progression sequence from the base provisioning state to a vendor provisioning state. This progression sequence is performed to transfer control and accountability of the device to a vendor within the supply chain. For example, while the device is in the base provisioning state, a first set of API methods can be implemented for transitioning the device to a Do Vendor Programming sub-state. For example, the first set of API methods can include "Read Device UID," "Read Programming Count," "Return Device State," "Return Accountability Info," "Read Configuration Signature," "Do Manufacturer Programming" and "Do Vendor Programming." The API method "Do Vendor Programming" can use an encrypted stream originating from the vendor brokering agent authorized by the secrets and service provider system to perform vendor programming operations. The encrypted stream can include the encrypted version of the set of vendor provisioning secrets data, in addition to transport protocol content and other metadata. The device can be placed in a first sub-state for Vendor Programming, enable the "Verify Authority" method, and enter a timeout period where only the visible functions are available. After performing "Do Vendor Programming," the progression sequence transitions the device to the Do Vendor Programming sub-state.

While the device is in the Do Vendor Programming sub-state, a second set of API methods can be implemented for transitioning the device to a Verify Authority sub-state. For the example, the second set of API methods can include "Read Device UID," "Read Responsible Vendor Pre," "Read Responsible Vendor Post," "Return Device State," and "Verify Authority." An encrypted request stream can be received from the secrets and service provider system, and a configuration verification stream can be sent to the secrets and service provider system. The API method "Read Responsible Vendor Pre" is active after "Do Vendor Programming" is called and before its timeout is reached. This API method can be used during a supersession sequence when two sets of vendor provisioning secrets data exist. This API method returns a current Vendor Certificate, and not a new temporary Vendor Certificate which is in the process of being promoted. The API method "Read Responsible Vendor Post" is also active after "Do Vendor Programming" is called and before its timeout is reached. This API method can be used during a supersession sequence and when two sets of vendor provisioning secrets data exist. In contrast to "Read Responsible Vendor Pre," this API method returns a new temporary vendor certificate which is in the process of being promoted (not the current vendor certificate).

The API method "Verify Authority" is utilized after the secrets and service provider system has been contacted and sent verification credentials. The encrypted stream originating from the vendor brokering agent is verified by the device to determine that the secrets and service provider system has authority to change the programming of the device. If "Verify Authority" is successful, the device is placed in a state where the "Insert Vendor Secrets" method is activated and a timeout is enabled. If "Verify Authority" fails, the device can be reset to a state before the "Do Vendor Programming" API method was utilized. After performing "Verify Authority," the progression sequence can transition to the Verify Authority sub-state barring any trigger that causes a reversion of the state of the device back to the base provisioning state (e.g., a timeout).

While the device is in the Verify Authority sub-state, a third set of API methods can be implemented for transitioning the device to an Insert Vendor Secrets sub-state. For example, the third set of API methods can include "Read Device UID," "Read Responsible Vendor Pre," "Read Responsible Vendor Post," "Return Device State," and "Insert Vendor Secrets." A new set of vendor provisioning secrets data and an installation verification stream can be received from the encrypted storage. The API method "Insert Vendor Secrets" is called after "Verify Authority" is performed to insert/program the new set of vendor provisioning secrets data into the device. For example, the vendor brokering agent can retrieve the new set of vendor provisioning secrets data from the secrets and service provider system, and send the new set of vendor provisioning secrets data to the device for insertion/programming. After the new set of vendor provisioning secrets data is inserted into the device, the device can operate in an Awaiting Commit State. If the Awaiting Commit state is achieved and a previous set of vendor provisioning secrets data exists in the device, then both the previous and the new sets of vendor provisioning secrets data can be maintained in the device (with both Vendor Certificates available) until the "Commit Vendor Supersession" API method is called, or a trigger causes a reversion of the state of the device to its previous state condition (e.g., a timeout). After the new set of vendor provisioning secrets data is inserted, the progression sequence can transition the device to the Insert Vendor Secrets sub-state barring any trigger that causes a reversion of the state of the device back to the base provisioning state (e.g., timeout).

While the device is in the Insert Vendor Secrets sub-state, a fourth set of API methods can be implementing for transitioning the device to a Seal Manufacturer Secrets sub-state. For example, the fourth set of methods can include "Read Device UID," "Read Programming Count Pre," "Read Programming Count Post," "Return Device State," and "Commit Vendor Provisioning Supersession." The API method "Commit Vendor Provisioning Supersession" can commit the newly inserted/programmed set of vendor secrets data into operation, thereby superseding previous credentials. To perform the "Commit Vendor Provisioning Supersession" API method, a Supersession Commit Packet can be received from the encrypted storage. After performing the "Commit Vendor Provisioning Supersession" API method, the set of manufacturer provisioning secrets data on the device can be sealed to arrive at the Seal Manufacturer Secrets sub-state, and the progression sequence can transition to the vendor provisioning state.

Now that the device is in the vendor provisioning state, ownership of the device is assigned to the corresponding vendor. Should accountability for the device need to change hands to a new vendor, the vendor reassignment process can be conducted in a similar way as the assigned vendor by calling the "Do Vendor Programming" routine again, and following the same process described above.

Another example of a progression sequence that can be performed at operation 620 is a progression sequence from the vendor provisioning state to an end-use provisioning state. More specifically, once the vendor has completed any required tasks with the device containing the device and is ready to pass the device along to an end-use stage of the supply chain, the secrets and service provider system can transition the device from the vendor provisioning state to the end-use provisioning state. For example, while the device is in the vendor provisioning state, a first set of API methods can be implemented for transitioning the device to a Do End-Use Programming sub-state. For example, the first set of API methods can include "Read Device UID," "Read Programming Count," "Return Device State," "Return Accountability Information," "Return Configuration Signature," "Read Configuration Signature," "Revert to Base Provisioning State," "Do Vendor Programming," and "Do End-Use Programming." The API method "Do End-Use Programming" initiates the process of inserting/programming a set of end-use provisioning secrets into the device. This API method can utilize an encrypted stream originating from an end-use brokering agent authorized by the secrets and service provider system to perform End-Use Programming operations. The encrypted stream can include the encrypted version of the set of end-use provisioning secrets, in addition to transport protocol content and other metadata. After performing "Do End-Use Programming," the progression sequence transitions to the Do End-Use Programming sub-state.

While the device is in the Do End-Use Programming sub-state, a second set of API methods can be implemented for transitioning the device to a Verify Authority sub-state. For the example, the second set of API methods can include "Read Device UID," "Read Responsible Vendor Pre," "Read Responsible Vendor Post," "Return Device State," and "Verify Authority," similar to those methods described above. An encrypted request stream can be received from the secrets and service provider system, and a configuration verification stream can be sent to the secrets and service provider system. After performing "Verify Authority," the progression sequence can transition to the Verify Authority sub-state barring any trigger that causes a reversion of the state of the device back to the vendor provisioning state (e.g., timeout).

While the device is in the Verify Authority sub-state, a third set of API methods can be implemented for transitioning the device to an Insert End-Use Secrets sub-state. For example, the third set of API methods can include "Read Device UID," "Read Responsible Vendor Pre," "Read Responsible Vendor Post," "Return Device State," and "Insert End-Use Secrets." A encrypted version of the set of end-use provisioning secrets data and an installation verification stream can be received from the encrypted storage.

The API method "Insert End-Use Secrets" can be called after "Verify Authority" is performed to place the device in a "Waiting End-Use Secrets" state. Information from the current end-use segment and sub-segments can be collected (e.g., by the end-use brokering agent), and the collected information can be used to create a new set of end-use provisioning secrets data for insertion onto the device. For example, the secrets and service provider system can insert the new set of end-use provisioning secrets data onto the device. The "Insert End-Use Secrets" API has a number of capabilities for inserting a new set of end-use provisioning secrets data onto the device, determined based on the contents of the new set of end-use provisioning secrets data. For example, one capability is to add an additional set of end-use provisioning secrets data and another capability is to overwrite the previous set of end-use provisioning secrets data. Other considerations can include determining the exact contents and differences between the previous and new set of end-use provisioning secrets data. Once the new set of end-use provisioning secrets data is inserted, the device can then operate in an "Awaiting Commit" state. If this state is achieved and a previous set of end-use provisioning secrets data exists, then both the previous and new set of end-use provisioning secrets data can be maintained in device (with both Network Certificates available) until the "Commit Vendor Supersession" API method is called or a timeout or other trigger can revert the state of the device to its previous state. After performing "Insert End-Use Secrets," the progression sequence can transition to the Insert Vendor Secrets sub-state barring any timeout or other trigger that causes a reversion of the state of the device back to the vendor provisioning state.

While the device is in the Insert End-Use Secrets sub-state, a fourth set of API methods can be implemented for transitioning the device to a Seal Vendor Secrets sub-state. For example, the fourth set of methods can include "Read Device UID," "Read Programming Count Pre," "Read Programming Count Post," "Return Device State," and "Commit End-Use Provisioning Supersession." To perform "Commit End-use provisioning Supersession," a Commit Supersession Stream can be received from the secrets and service provider system. The API method "Commit End-Use provisioning Supersession" commits the set of end-use provisioning secrets data and supersedes old credentials (e.g., old end-use brokering agent credentials). After performing the "Commit End-Use provisioning Supersession" API method, the set of vendor provisioning secrets data previously inserted onto the device can be sealed to arrive at the Seal Vendor Secrets sub-state, and the progression sequence can transition to the end-use provisioning state.

Another example of a progression sequence that can be performed at operation 620 is a progression sequence from the end-use provisioning state to an operational state. More specifically, once the device is in the end-use provisioning state, the secrets and service provider system can transition the device from the end-use provisioning state to the operational state in which the device can operate on the network. For example, while the device is in the end-use provisioning state, a first set of API methods can be implemented for transitioning the device to a Create Operational Configuration sub-state. For example, the first set of API methods can include "Read Device UID," "Return Device State," "Return Accountability Information," "Return Vendor Certificate," "Return Network Certificate," "Read Configuration Signature," "Revert to Vendor Provisioning State," "Do End-Use Programming," and "Create Operational Configuration." The API method "Return Vendor Certificate" can read the Vendor Certificate from the device, and the API method "Return Network Certificate" can read the Network Certificate from the device. These API methods can be equipped with a timer as to how often it can be called to ensure that repeated calling does not interfere with the operation of the device, but also that it cannot be a feature used for an attack (e.g., Denial of Service attack). The API method "Revert to Vendor Provisioning State" can be used to revert back to the vendor provisioning state in order to remove the set of end-use provisioning secrets data and unseal the currently-sealed set of vendor provisioning secrets data. This API can require permission from the secrets and service provider system through an authorized vendor brokering agent. The API method "Create Operational Configuration" can initiate the process of generating an operational configuration inside of the device, followed by the (partial) sealing of the set of end-use provisioning secrets data. This may require communication with at least one of the secrets and service provider system, the end-use brokering agent, etc. After performing "Create Operational Configuration," the progression sequence transitions to the Create Operational Configuration sub-state.

While the device is in the Create Operational Configuration sub-state, a second set of API methods can be implemented for transitioning the device to a Verify Authority sub-state. For the example, the second set of API methods can include "Read Device UID," "Read Operational Configuration Pre," "Read Operational Configuration Post," "Return Device State," and "Verify Authority." An encrypted request stream can be received from the secrets and service provider system, and operational components can be sent to the secrets and service provider system. The API method "Read Operational Configuration Pre" is generally active after "Create Operational Configuration" is called and before its timeout is reached. This API method can be used during a supersession sequence and when two sets operational secrets data exist. This method returns the current use Operational Configuration and not the new temporary Operational Configuration that is in the process of being promoted. The API method "Read Operational Configuration Post" is generally active after "Create Operational Configuration" is called and before its timeout is reached. This method is used during a supersession sequence and when two sets of operational secrets provisioning data exist. This method returns the new temporary Operational Configuration which is in the process of being promoted and not the current use Operational Configuration. After performing the "Verify Authority" API method, the progression sequence can transition to a Verify Authority sub-state barring any timeout or other trigger that causes a reversion of the state of the device back to the end-use provisioning state.

While the device is in the Verify Authority sub-state, a third set of API methods can be implemented for transitioning the device to a Spawn Operational Configuration sub-state. For example, the third set of API methods can include "Read Device UID," "Read Responsible Vendor Pre," "Read Responsible Vendor Post," "Return Device State," and "Spawn Operational Configuration." An Owner Authorization Package and an Authentication Verification Stream can be received from the secrets and service provider system. The API method "Spawn Operational Configuration" can cause the creation of an operational configuration based on the set of end-use provisioning secrets data and network segment/sub-segments information provided during the End-Use Programming. After performing the "Spawn Operational Configuration" API method, the progression sequence can transition to the Spawn Operational Configuration sub-state, barring any timeout or other trigger that causes a reversion of the state of the device back to the end-use provisioning state.

While the device is in the Spawn Operational Configuration sub-state, a fourth set of API methods can be implemented for transitioning the device to a Seal End-Use Secrets sub-state. For example, the fourth set of API methods can include "Read Device UID," "Read Programming Count Pre," "Read Programming Count Post," "Return Device State," and "Commit Operational Supersession."

The API method "Commit Operational Supersession" can commit the operational configuration created using the "Spawn Operational Configuration" API method. To perform "Commit Operational Supersession," a Commit Supersession Stream can be received from the encrypted storage. After performing the "Commit Operational Supersession" API method, the set of end-use provisioning secrets data can be sealed to arrive at the Seal End-Use Secrets sub-state, and the progression sequence can transition to the operational state.

Figure 7:
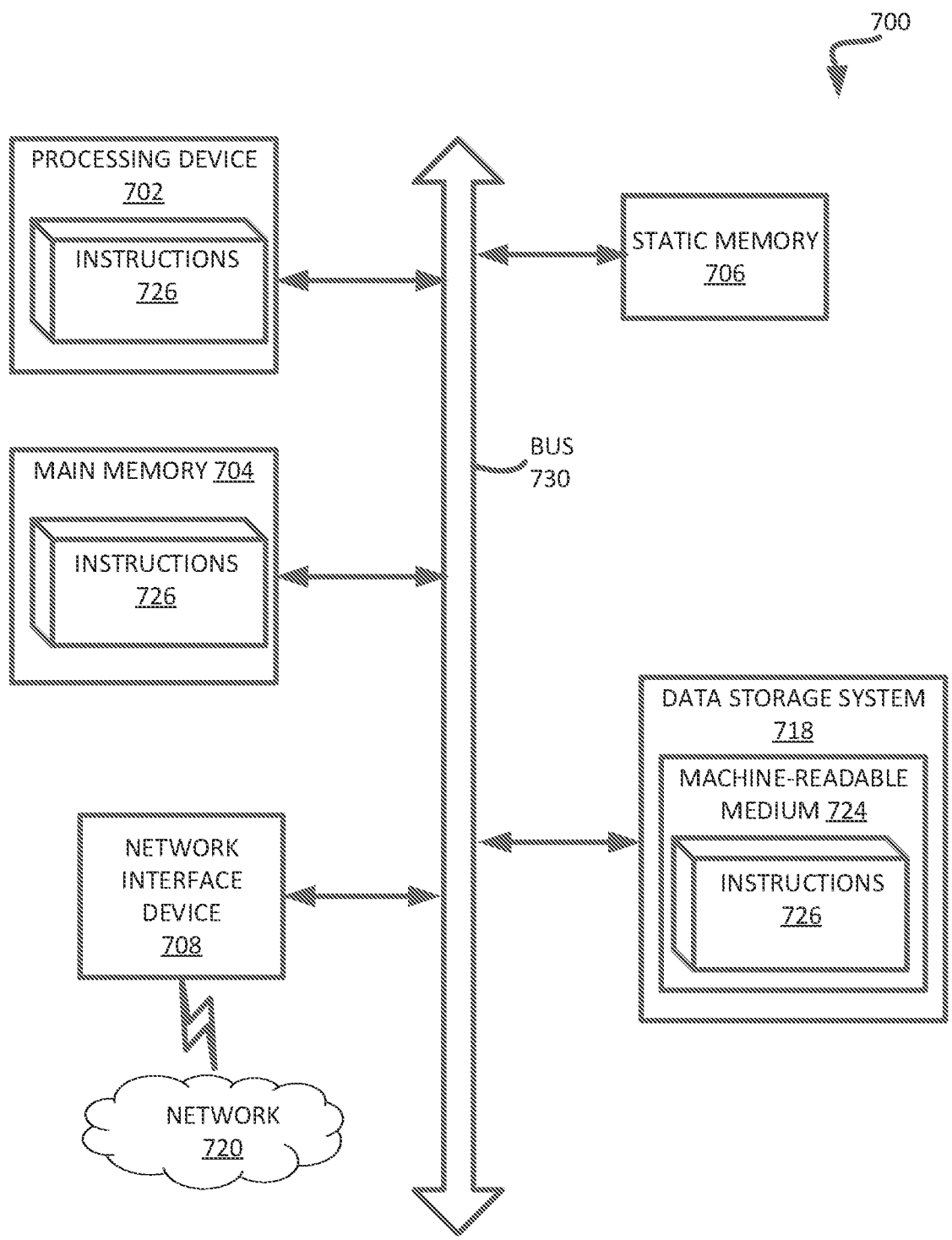
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can implement one or more components of a secrets and service provider system 130-1 (e.g., the secrets and service provider system 130-1 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or RDRAM, etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media.

In one embodiment, the instructions 726 include instructions to implement functionality corresponding to the secrets and service provider system. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
   a memory device; and
   a processor, operatively coupled with the memory device, to perform operations comprising:
   receiving, via a brokering agent, a request to provide a device, in a current supply chain state corresponding to a current stage of a supply chain of the device, with a set of secrets data corresponding to a target supply chain state of the device corresponding to a target stage of the supply chain, wherein the device in the current supply chain state is associated with a first entity corresponding to the current stage;
   determining whether to authorize the request; and
   in response to authorizing the request, causing the set of secrets data to be provided to the device to cause the device to transition from the current supply chain state to the target supply chain state, wherein the device in the target supply chain state is associated with a second entity corresponding to the target stage.

2. The system of claim 1, wherein the operations further comprise maintaining, on a distributed ledger, a record indicative of the set of secrets data being provided to the device.

3. The system of claim 1, wherein the operations further comprise, in response to not authorizing the request:
   denying access to the set of secrets data; and
   maintaining, on a distributed ledger, a record indicative of denying access to the set of secrets data.

4. The system of claim 1, wherein:
   determining whether to authorize the request further comprises:
      determining whether the brokering agent is authorized to handle the request;
      in response to determining that the brokering agent is authorized to handle the request, receiving, from the device via the brokering agent, a supersession package corresponding to the device being in a supersession state; and
      determining whether the device has permission to transition to the target supply chain state based on the supersession package; and
   causing the set of secrets data to be provided further comprises:
      in response to determining that the device has permission to transition to the target supply chain state based on the supersession package, sending, to the device via the brokering agent, a commit package to commit the set of secrets data.

5. The system of claim 1, wherein the target supply chain state is one of:
   a manufacturer provisioning state corresponding to a manufacturing stage of a supply chain, the second entity being associated with a manufacturer of the device;
   a vendor provisioning state corresponding to a vendor stage of the supply chain the second entity being associated with a vendor in possession of the device;
   an end-use provisioning state corresponding to an end-use stage of the supply chain;
   or an operational state corresponding to an operational stage of the supply chain.

6. The system of claim 1, wherein the set of secrets data is generated by a hardware security module.

7. The system of claim 1, wherein the device in the current supply chain state maintains a second set of secrets data corresponding to the current supply chain state.

8. A method comprising:
   receiving, by a processor via a brokering agent, a request to initiate a supply chain state progression of a device from a current supply chain state corresponding to a current stage of a supply chain of the device to a target supply chain state corresponding to a target stage of the supply chain, wherein the device in the current supply chain state is associated with a first entity corresponding to the current stage;
   determining, by the processor, whether to authorize the request; and
   in response to authorizing the request, causing, by the processor, the device to transition from the current supply chain state to the target supply chain state by providing a set of secrets data corresponding to the target supply chain state, wherein the device in the target supply chain state is associated with a second entity corresponding to the target stage.

9. The method of claim 8, further comprising maintaining, by the processor on a distributed ledger, a record indicative of the transition of the device to the target supply chain state.

10. The method of claim 8, further comprising, in response to not authorizing the request, preventing, by the processor, the device from transitioning to the target supply chain state.

11. The method of claim 8, wherein:
determining whether to authorize the request further comprises:
- determining whether the brokering agent is authorized to handle the request;
- in response to determining that the brokering agent is authorized to handle the request, receiving, from the device via the brokering agent, a supersession package corresponding to the device being in a supersession state; and
- determining whether the device has permission to transition to the target supply chain state based on the supersession package; and causing the device to transition from the current supply chain state to the target supply chain state comprises:
- in response to determining that the device has permission to transition to the target supply chain state based on the supersession package, sending, to the device via the brokering agent, a commit package to commit the set of secrets data.

12. The method of claim 8, wherein the set of secrets data is generated by a hardware security module.

13. The method of claim 8, wherein the target supply chain state is one of:
- a manufacturer provisioning state corresponding to a manufacturing stage of a supply chain, the second entity being associated with a manufacturer of the device;
- a vendor provisioning state corresponding to a vendor stage of the supply chain, the second entity being associated with a vendor in possession of the device;
- an end-use provisioning state corresponding to an end-use stage of the supply chain;
- or an operational state corresponding to an operational stage of the supply chain.

14. The method of claim 8, wherein the device in the current supply chain state maintains a second set of secrets data corresponding to the current supply chain state.

15. A non-transitory computer-readable storage medium comprising instructions that, when executed by a processing device, cause the processing device to perform operations comprising:
- receiving, via a brokering agent, a request to provide a device, in a current supply chain state corresponding to a current stage of a supply chain of the device, with a set of secrets data corresponding to a target supply chain state of the device corresponding to a target stage of the supply chain, wherein the device in the current supply chain state is associated with a first entity corresponding to the current stage;
- determining whether to authorize the request; and
- in response to authorizing the request, causing the set of secrets data to be provided to the device to cause the device to transition from the current supply chain state to the target supply chain state, wherein the device in the target supply chain state is associated with a second entity corresponding to the target stage.

16. The non-transitory computer-readable storage medium of claim 15, wherein the operations further comprise maintaining, on a distributed ledger, a record indicative of the set of secrets data being provided to the device.

17. The non-transitory computer-readable storage medium of claim 15, wherein the operations further comprise, in response to not authorizing the request:
- denying access to the set of secrets data; and
- maintaining, on a distributed ledger, a record indicative of denying access to the set of secrets data.

18. The non-transitory computer-readable storage medium of claim 15, wherein:
determining whether to authorize the request further comprises:
- determining whether the brokering agent is authorized to handle the request;
- in response to determining that the brokering agent is authorized to handle the request, receiving, from the device via the brokering agent, a supersession package corresponding to the device being in a supersession state; and
- determining whether the device has permission to transition to the target supply chain state based on the supersession package; and causing the set of secrets data to be provided further comprises:
- in response to determining that the device has permission to transition to the target supply chain state based on the supersession package, sending, to the device via the brokering agent, a commit package to commit the set of secrets data.

19. The non-transitory computer-readable storage medium of claim 15, wherein the target supply chain state is one of:
- a manufacturer provisioning state corresponding to a manufacturing stage of a supply chain, the second entity being associated with a manufacturer of the device;
- a vendor provisioning state corresponding to a vendor stage of the supply chain the second entity being associated with a vendor in possession of the device;
- an end-use provisioning state corresponding to an end-use stage of the supply chain;
- or an operational state corresponding to an operational stage of the supply chain.

20. The non-transitory computer-readable storage medium of claim 15, wherein the set of secrets data is generated by a hardware security module.

* * * * *